United States Patent [19]

Lavin

[11] 4,195,810

[45] Apr. 1, 1980

[54] PINCH VALVE

[76] Inventor: Aaron M. Lavin, 3500 Davisville Rd., Hatboro, Pa. 19040

[21] Appl. No.: 892,241

[22] Filed: Mar. 31, 1978

[51] Int. Cl.² .............................................. F16K 7/07
[52] U.S. Cl. ........................................ 251/5; 285/321
[58] Field of Search ...................................... 251/4–10, 251/61.1; 285/321

[56] References Cited

U.S. PATENT DOCUMENTS

| 2,345,693 | 4/1944 | Wilson et al. ........................ 251/5 X |
| 3,511,240 | 5/1970 | Williams et al. ..................... 251/5 X |
| 3,885,769 | 5/1975 | Morrison ................................. 251/5 |

FOREIGN PATENT DOCUMENTS 1024300  1/1954  Fed. Rep. of Germany .............. 251/5

Primary Examiner—Martin P. Schwadron
Assistant Examiner—Richard Gerard
Attorney, Agent, or Firm—Caesar, Rivise, Bernstein & Cohen, Ltd.

[57] ABSTRACT

A pinch valve comprising a cylindrical housing having a sidewall and an opposed pair of end walls each having an opening. A resilient tubular sleeve having a central passageway is disposed within the housing with its ends frictionally fit within respective openings in the end walls and with its outside surface spaced from the inside surface of the housing's sidewall to form a control chamber. A control port extends through the sidewall of the housing into communication with the chamber. A pair of tubular nipples are frictionally fit within respective ends of the passageway. The thickness of the sleeve wall at portions contiguous with each nipples' inner end is at least equal to the radius of the passageway in that nipple. The nipples and the housing end wall openings each include peripheral grooves for receipt of contiguous portions of the sleeve therein to form fluid tight seals. Snap rings and cap plates are used to hold the housing, sleeve and nipples together.

14 Claims, 4 Drawing Figures

PINCH VALVE

This invention relates generally to valves and more particularly to pinch valves.

Various pneumatic or hydraulic pressure controlled pressure pinch valves are commercially available. One common type of pinch valve comprises a tubular metal housing in which a resilient constrictor sleeve is disposed. The sleeve includes a longitudinally extending passageway between the valves input and output and terminates in a pair of flanged ends. A pair of threaded end connectors or caps are secured into respective threaded ends of the housing to hold the constrictor sleeve in place by interposing the flanged ends of the sleeve between the cap and a seat in the housing. With the sleeve in place a sealed control chamber is created between the outside of the sleeve and the inside surface of the housing. Each threaded cap includes a central threaded hole which communicates with the longitudinal passageway in the sleeve. The hole in one cap serves as the input port for the valve while the hole in an opposed cap serves as the output port. A control port extends through the housing sidewall and into communication with the control chamber. By pressurizing the control chamber, via the control port, the sleeve is constricted, thereby restricting or otherwise halting the flow of fluid between the input and output ports.

While such valves are relatively simple in construction and are suitable for the tasks for which they are designed, they nevertheless suffer from some drawbacks, the most significant of which is their cost, since the molded sleeve and molded or machined housings and caps are relatively expensive to produce.

The A. M. Lavin Machine Works of Hatboro, Pa. has sold centrifuges including optional sludge removal devices. Such devices have in the recent past incorporated a simplified pinch valve which I invented and which overcame the abovenoted disadvantages of the prior art. To that end my simplified valve comprised a cylindrical housing having a sidewall and opposed pair of end walls. Each sidewall included a non-threaded opening. A tubular, thin walled resilient constrictor sleeve was disposed within the housing with each end of the sleeve extending through and frictionally fit within a respective opening in the housing's end walls and with the outside surface of the sleeve spaced from the inside surface of the housing's sidewall to form a control chamber. A respective threaded tubular nipple was frictionally fit into each end of the sleeve. The nipples and each of the housing's end wall openings included peripheral grooves into which a contiguous portion of the sleeve was forced by the frictional fit to form fluid-tight seals. Each nipple included a peripheral annular groove into which a snap ring was disposed and abutting the end of the sleeve. A respective cap plate, having a central hole, was disposed over each snap ring and secured to the associated housing end walls by plural screws. Each cap plate included a recess about the periphery of the hole to accommodate the snap ring, yet allow it to fit flush to the housing's end wall.

Like earlier prior art pinch valves pressurization of the control chamber of my pinch valve, via its port, resulted in the constriction of its sleeve, thereby stopping the flow of fluid between the nipples.

While my earlier pinch valve proved functional it was discovered that repeated operation soon resulted in its breakdown. The breakdown manifested itself in the cracking or splitting of the thin walled sleeve at the inner edge of the nipple and occurred as the sleeve attempted to fold over itself, stretch and balloon into the nipple's passageway.

Accordingly, it is a general object of the instant invention to provide a pinch valve which has the advantages of my earlier pinch valve yet which overcomes its disadvantages.

It is a further object of the instant invention to provide a pinch valve which is simple in construction yet suitable for long-term, repeated operation.

It is still a further object of the instant invention to provide a pinch valve which does not require a specially molded constrictor sleeve.

It is still a further object of the instant invention to provide a pinch valve which is low in cost.

It is still a further object of the instant invention to provide a pinch valve which is simple in construction and which can be readily assembled and dissembled.

These and other objects of the instant invention are achieved by providing a pinch valve comprising a hollow housing having a pair of end walls and a sidewall including a control port. Each of the end walls includes an opening communicating with the hollow interior of the housing. A constrictable, tubular sleeve formed of a resilient material and having a pair of ends and a central passageway extending longitudinally therebetween is disposed within the housing but spaced from the sidewall to form a control chamber between it and the sidewall. One end of the constrictable sleeve is frictionally fit within the opening in one end wall of the housing while the other end of the sleeve is similarly fit within the opening in the other end wall. A pair of tubular couplings or nipples, each having a passageway extending therethrough are frictionally fit within respective ends in the central passageway of the constrictable sleeve and fit. The thickness of the sidewall of the constrictable sleeve immediately adjacent to the end of the nipple extending therein is at least equal to the radius of the passageway in the nipple. The constrictable sleeve is arranged to close its central passageway when the control chamber is pressurized, via the control port, to thereby restrict or otherwise interrupt the flow of fluid through the central passageway between the nipples.

Other objects and many of the attendant advantages of this invention will be readily appreciated as the same becomes better understood by reference to the following detailed description when considered in connection with the accompanying drawings wherein.

Figure 1:
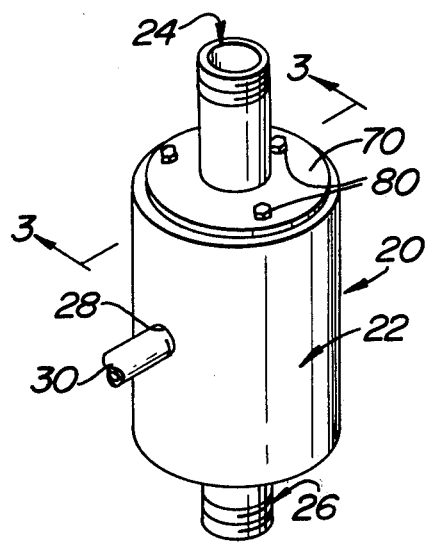
FIG. 1 is a perspective view of an assembled pinch valve in accordance with the instant invention.

Referring now to the various figures of the drawing wherein like reference characters refer to like parts, there is shown in FIG. 1 an improved pinch valve 20. The valve basically comprises a hollow housing 22, an input coupling or nipple 24, an output coupling or nipple 26 and a threaded control port 28. The valve 20 is arranged to pass fluid, i.e., liquid or gas, from its input nipple 24 to its output nipple 26 when the valve is "open" and to restrict or otherwise interrupt the flow of fluid between the input and output when the valve is "closed." "Closing" of the valve is accomplished by pressurizing the valve through its control port 28. To that end a control line 30 is threadedly engaged therein. The line 30 is connected to means, not shown, providing either pneumatic or hydraulic pressure for controlling operation of the valve 20.

A constrictor sleeve 32, in the form of a cylindrical length of tubing having a central passageway 40, is mounted within the housing 22 between the input nipple 24 and the output nipple 26. The central passageway serves as the conduit to carry fluid through the valve from its input to its output.

In accordance with the instant invention the sleeve 32 is formed of a resilient material, such as rubber, Neoprene, Butyl and Silicone, etc.

In the preferred embodiment shown herein the sleeve includes a rather wide concave recess 34 machined in the central portion of its outer periphery between its ends 36 and 38. It should be pointed out at this juncture that while the sleeve 32 is shown as including the recess 34 extending thereabout such a recess is not mandatory to the construction of the valve 20. In this regard the valve 20 can utilize a sleeve 32 of constant wall thickness throughout its length. To form such a sleeve all that is necessary is to cut a desired length of tubing from suitably dimensioned tubular stock. Even with the preferred embodiment of the sleeve shown herein fabrication is simple and special molds are unnecessary. To that end all that is required to form the sleeve 34 shown is to machine the central portion of the outer periphery of a length of tube cut from standard tubular stock.

Figure 3:
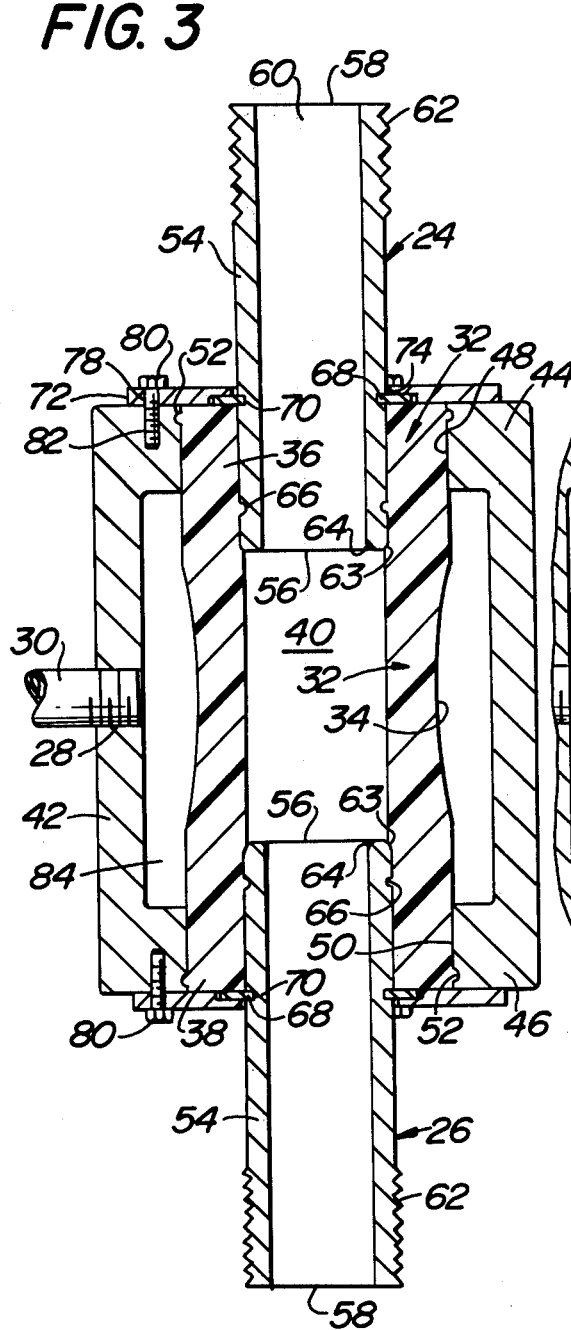
FIG. 3 is an enlarged sectional view taken along line 3—3 of FIG. 1.
Figure 4:
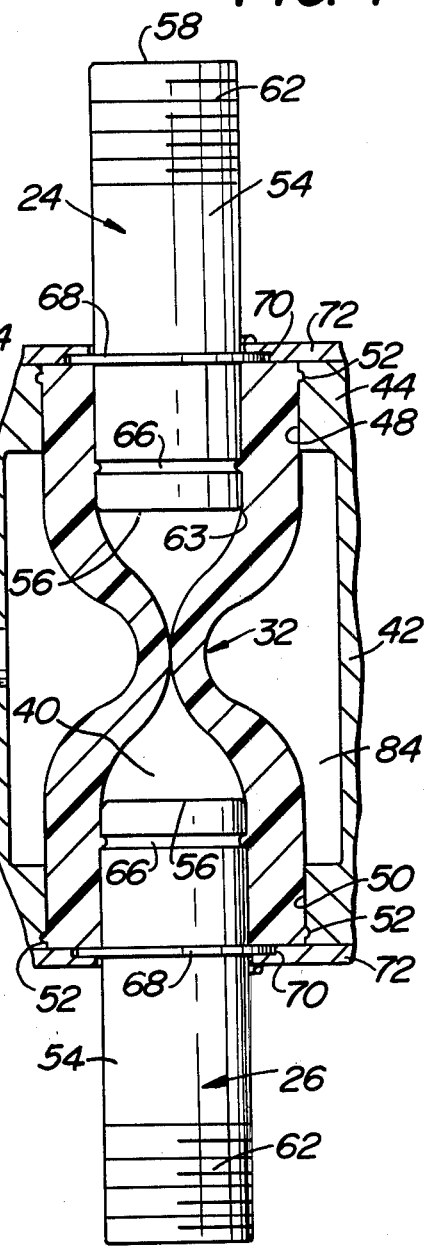
FIG. 4 is an enlarged view, partially in section and similar to that shown in FIG.. 3 but with the valve shown in its "closed" condition.

As can be seen in FIGS. 1, 3 and 4 the housing 22 is an integrally formed body, preferably formed of cast aluminum, and having a circular sidewall 42 and a pair of opposed end walls 44 and 46. The end wall 44 includes a central opening 48 and the end wall 46 includes a similar central opening 50. The openings 48 and 50 are coaxially aligned. The peripheral surface of each of the openings 48 and 50 is smooth and each includes an annular recess or groove 52 located close to the outer surface of the end wall. The inside diameter of the sidewall 42 of the housing 22 is greater than the inside diameter of either of the openings 48 and 50 in the sidewalls 44 and 46, respectively.

The length of sleeve 32 is the same as the length of housing 22, that is the distance between the outside surface of end wall 44 and the outside surface of end wall 46. The sleeve 32 is arranged to be disposed within the housing 22 and frictionally fit therein. Accordingly, the outside diameter of the sleeve 32 adjacent its ends 36 and 38 is slightly greater than the inside diameter of openings 48 and 50 such that when the portion of the sleeve 32 contiguous with end 36 is located within opening 48 in the end wall 48 it is frictionally engaged therein. Similarly when the portion of the sleeve contiguous with the end 38 is located within the opening 50 in the end wall 46 it is frictionally engaged therein.

The end surface 36 of the sleeve is flush with the outside surface of the end wall 40 while the end surface 38 of the sleeve is flush with the end surface of end wall 46. By virtue of the oversize diameter of the sleeve ends with respect to openings 48 and 50 a portion of the periphery of each end of the sleeve is forced into the annular grooves 52, thereby forming fluid-tight seals between the outer periphery of the sleeve and the inner periphery of the holes in the housing.

Figure 2:
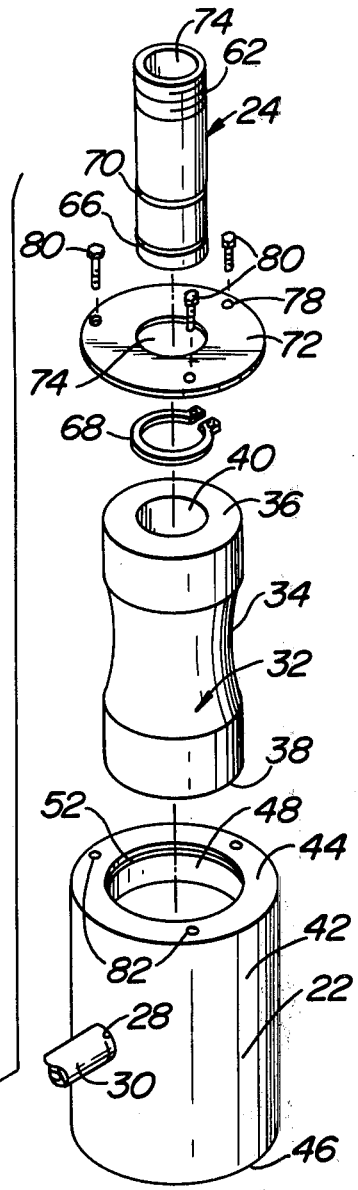
FIG. 2 is an exploded view of the valve shown in FIG. 1.
Figure 2:
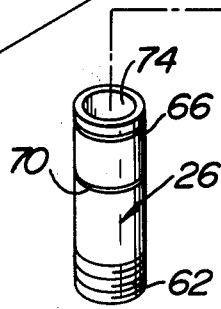

As can be seen in FIGS. 2, 3 and 4 each of the nipples 24 and 26 is of identical construction and comprises an elongated tubular member having a sidewall 54, an inner end 56 and an outer end 58. A passageway 60 extends longitudinally the entire length of each nipple between its outer end 58 and inner end 56. The periphery of the sidewall 54 contiguous with the outer end 58 is threaded at 62. The threads provide means for connecting the valve between an input line and output line. The inside end 56 of each nipple includes a gently curved outer arcuate edge 63 and a more sharply curved inner arcuate edge 64.

In accordance with a preferred aspect of this invention the outer diameter of each of the nipples is slightly larger than the inside diameter of the central passageway 40 in the sleeve 32. Accordingly, when the inner end 56 of each of the nipples 24 and 26 is inserted within a respective end of the passageway 40 the nipples are frictionally held therein.

As can be seen clearly in FIG. 3 each nipple includes an annular groove 66 extending about its outer periphery adjacent to its inner end 56. The groove 66 acts in a similar manner to the groove 52 in conjunction with the material of sleeve 32 to form a fluid-tight seal between the sleeve and the associated nipples.

In order to lock the nipples 24 and 26 in place in their respective ends of the sleeve a pair of snap rings 68 are provided. To that end each nipple includes an annular groove 70 in its outer periphery for receipt of a respective snap ring 68. When disposed in its associated groove each snap ring abuts the associated end of resilient sleeve 32 to act as a stop preventing the nipples from further inward displacement into the central passageway 40 of the sleeve.

Accidental removal of a nipple from the sleeve passageway is precluded by a circular mounting plate 72. One such plate is secured to each end of the valve 20. The plate 72 is a planar circular member having a central hole 74 through which a nipple extends. The inside diameter of each hole 74 is slightly larger than the outside diameter of the nipple extending therethrough. An annular recess 76 (FIG. 2) is cut in the inside surface of each mounting plate 72 contiguous with the central hole 74 and is configured to accommodate the snap ring 68 while enabling the plate 72 to fit flush with the end surface of the end wall on which it is located. Each plate also includes plural mounting holes 78 at spaced locations around the periphery thereof adapted to receive threaded fasteners or screws 80 therethrough. Corresponding threaded holes 82 are provided in each of the end walls 44 and 46 for receipt of the screws 80.

As will thus be appreciated when the mounting plate 72 is secured to associated end wall of the housing the snap ring located within the groove in the associated nipple is locked in place within the recess 76. This action prevents accidental removal of the nipple from the interior of the sleeve 32.

In accordance with the preferred embodiment of this invention the thickness of the wall of the sleeve 32 at portions contiguous with the inner edge 62 of each nipple is at least equal to the radius of the passageway 74 through the nipple. This feature is of utmost importance to preclude splitting of the sleeve sidewall at the point of contact with the nipple edge, which had characterized my prior valves utilizing thin walled sleeves.

The maximum outside diameter of the sleeve 32 is less than the inside diameter of the sidewall 42 of the housing 22. Accordingly an annular space or chamber is created between the outer periphery of the sleeve and the inner periphery of the sidewall. The control port 28 communicates with the chamber 84 so that the chamber serves as the pressure controller for the valve. As is conventional, pressurization of the control chamber, if of sufficient magnitude, causes the valve to close. To that end if the pressure within the control chamber, as provided via port 28 and line 30, is greater than the pressure of the fluid passing through the sleeve's passageway 40 and the inherent resistance of the material forming the sleeve 32, the sleeve constricts, like that shown in FIG. 4, thereby closing off passageway 40 and interrupting the fluid flow between the input and the output nipples of the valve.

As should be appreciated by those skilled in the art by utilizing an annular depression 34 in the outer periphery of the sleeve 32 the wall section of the sleeve at the central portion is rendered substantially thinner and more flexible. Accordingly, less external control pressure is necessary in chamber 84 to effect the constriction of the valve than would otherwise be necessary if the sleeve's sidewall was of constant thickness throughout.

It should be pointed out at this juncture that whether or not the sleeve 32 includes a reduced thickness central walled portion, the thickness of the wall of the sleeve at the points contiguous with the inner end of the nipple should be at least equal to the radius of the passageway of th nipple to preclude failure by splitting under repeated operation.

For valves utilizing hydraulic, e.g., oil, water, etc., control pressure an air bleed port (not shown) is provided in the sidewall of the valve and communicating with the control chamber.

As will be appreciated from the foregoing the pinch valve of the instant invention utilizes the elastic, tensile and compressive strength of the sleeve to function as a pressure controlled closure which is also self opening to permit maximum free, non-interfering flow therethrough. All this is accomplished without subjecting the sleeve to focussed tensile stress at the surface contiguous with the inner edge of the nipple as had characterized my earlier valve and caused its premature failure. In this regard the sleeve of the instant invention, on closing, operates more in a compression mode than my earlier valve's sleeve and in so doing renders it suitable for long term, failure-free, repeated operation.

In addition the valve of the instant invention is simple in construction can be readily assembled and dissembled, and does not require intricate molded or machined components.

Without further elaboration, the foregoing will so fully illustrate my invention that others may, by applying current or future knowledge, readily adapt the same for use under various conditions of service.

What is claimed as the invention is:

1. A pinch valve comprising a hollow housing having a control port, a pair of end walls and a side wall, each of said end walls including an opening therein communicating with the interior of said housing, a constrictable tubular member formed of a resilient material and having a circular sidewall terminating in an opposed pair of ends and a central passageway extending therebetween for carrying a fluid therethrough, and a pair of tubular couplings each of said couplings having a passageway extending therethrough, said constrictable member being disposed within said housing but spaced from said side wall to form a control chamber therebetween and with one end of the constrictable member being frictionally fit within the opening in one end wall and the other end of the constrictable member being frictionally fit within the opening in the other end wall, one end of one of said couplings being frictionally fit within said central passageway and one end of the other coupling being frictionally fit within the other end of said central passageway, the transverse thickness of the circular sidewall of said constrictable member disposed contiguous to the end of the coupling extending therein being at least equal to the radius of the passageway in said couplings, whereupon when said control chamber is pressurized said constrictable member constricts the central passageway restricting the flow of fluid therethrough without moving into the passageways in said couplings.

2. The valve of claim 1 wherein each of said couplings includes an annular groove in the periphery thereof and in which a portion of said constrictable member is disposed to produce a fluid tight seal.

3. The valve of claim 2 wherein said housing includes an annular groove about the periphery of each of said openings and in which a portion of said constrictable member is disposed to produce a fluid tight seal.

4. The valve of claim 3 wherein the wall of said constrictable member intermediate its ends is thinner than the portions thereof contiguous with the ends of the couplings extending into the central passageway.

5. The valve of claim 4 wherein the outer periphery of the constrictable member intermediate its ends comprises an annular recess.

6. The valve of claim 3 wherein the constrictable member is formed of rubber.

7. The valve of claim 5 additionally comprising means for securing the constrictable member and the couplings in place with respect to said housing.

8. The valve of claim 7 wherein said securing means comprises a snap ring located within a annular groove in said coupling abutting the end of the constrictable member.

9. The valve of claim 8 wherein said securing means also comprises a plate having a central hole therein through which said coupling passes and an annular recess disposed about said hole accommodating said snap ring therein, said plate being releasably securable to the end wall of said housing.

10. The valve of claim 9 wherein said plate is releasably secured to said housing by threaded fastening means.

11. A pinch valve comprising a hollow housing having a control port, a pair of end walls and a sidewall, each of said end walls including an opening having an annular groove about the periphery thereof and communicating with the interior of said housing, said constrictable member having a wall formed of a resilient material, a pair of ends, and a central passageway extending therebetween for carrying a fluid therethrough, and a pair of tubular couplings, each of said couplings including an annular groove in the periphery thereof and having a passageway extending therethrough, said constrictable member being disposed within said housing but spaced from said sidewall to form a control chamber therebetween and with one end of the constrictable member being frictionally fit within the opening in one end wall, with a portion of said constrictable member being disposed within the annular groove of said opening to form a fluid tight seal, with the other end of the constrictable member being frictionally fit within the opening in the other end wall and with a portion of said constrictable member being disposed in the annular groove of said opening to form a fluid tight seal, one end of one of said couplings being frictionally fit within said central passageway, with a portion of said constrictable member disposed in the annular groove in said coupling to form a fluid tight seal and one end of the other coupling being frictionally fit within the other end of said central passageway, with a portion of said constrictable member disposed in the annular groove in said coupling to form a fluid tight seal, the periphery of said constrictable member intermediate its ends comprising an annular recess, the thickness of the portions of the wall of said constrictable member contiguous with the end of each of said couplings extending therein being at least equal to the radius of the passageways in said couplings and with the wall of the constrictable member intermediate its ends being thinner than the portions thereof contiguous with the end of the couplings extending therein, means for securing said constrictable member and couplings in place with respect to said housing comprising a snap ring located within an annular groove in said coupling abutting the end of said constrictable member, said constrictable member being arranged to constrict the central passageway to restrict the flow of fluid therethrough when said control chamber is pressurized via said control port.

12. The valve of claim 11 wherein said securing means also comprises a plate having a central hole therein through which said coupling passes and an annular recess disposed about said hole accommodating said snap ring therein, said plate being releasably secureable to the end wall of said housing.

13. The valve of claim 12 wherein said plate is releaseably secured to said housing by threaded fastening means.

14. The valve of claim 13 wherein said constrictible member is formed of rubber.

* * * * *